Patented Aug. 31, 1926.

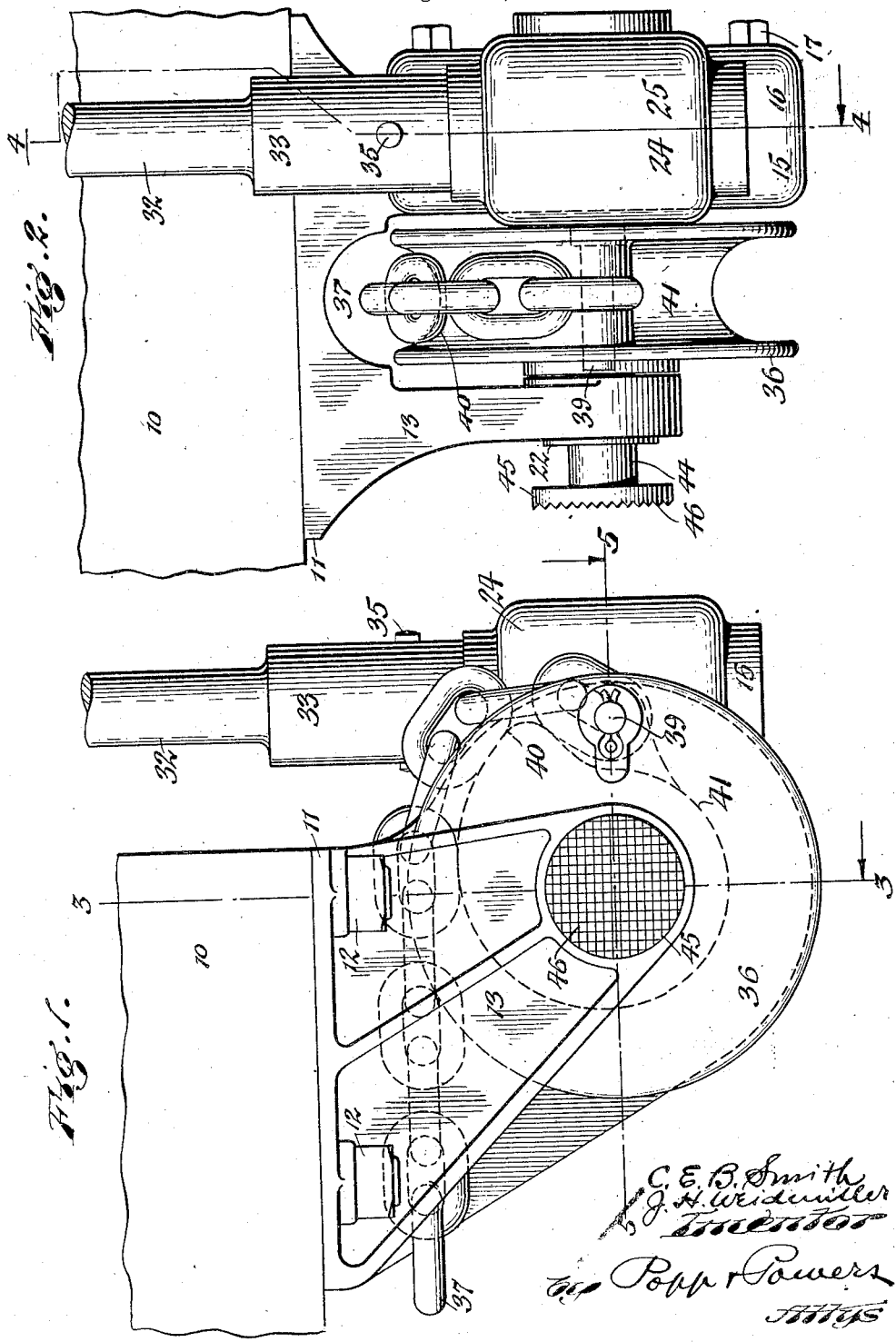

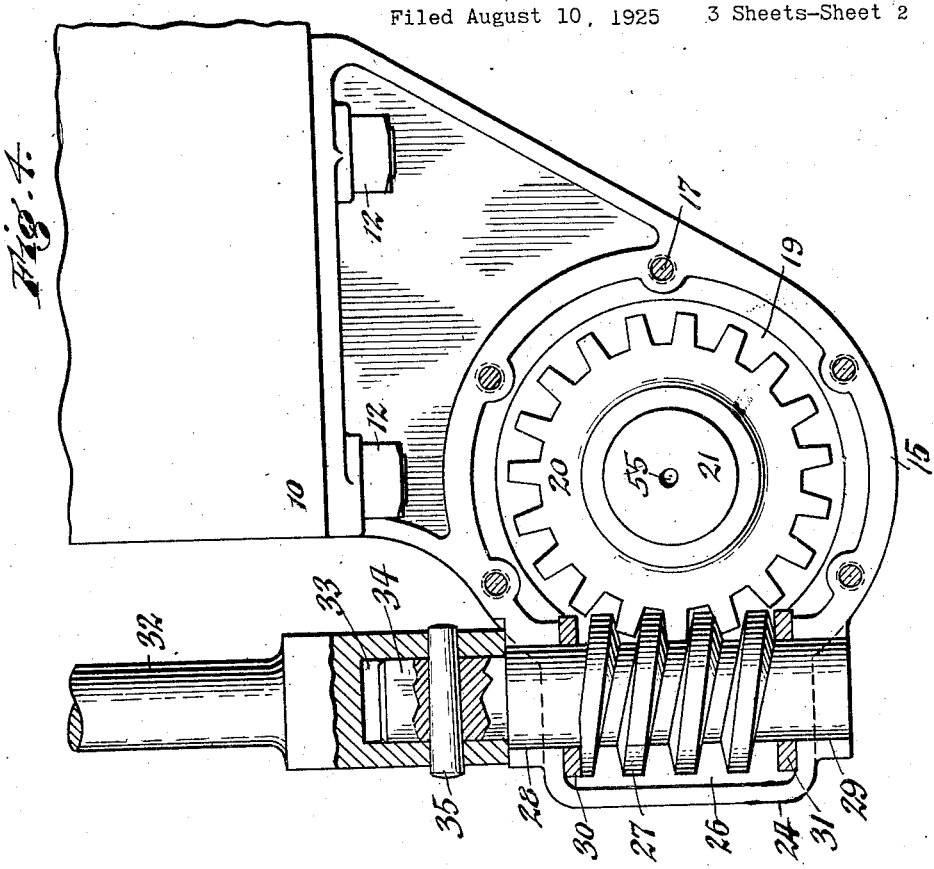
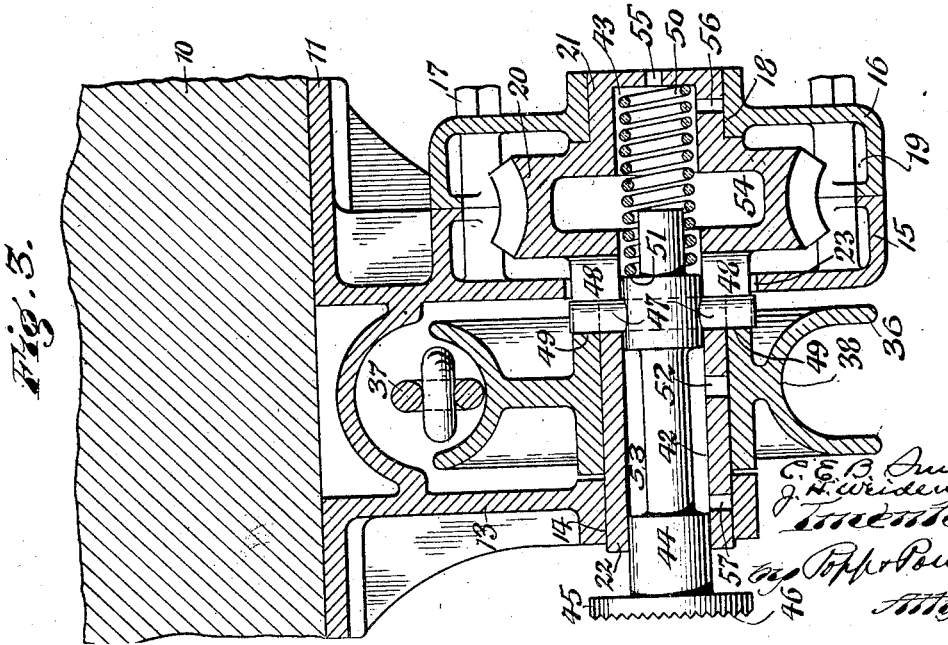

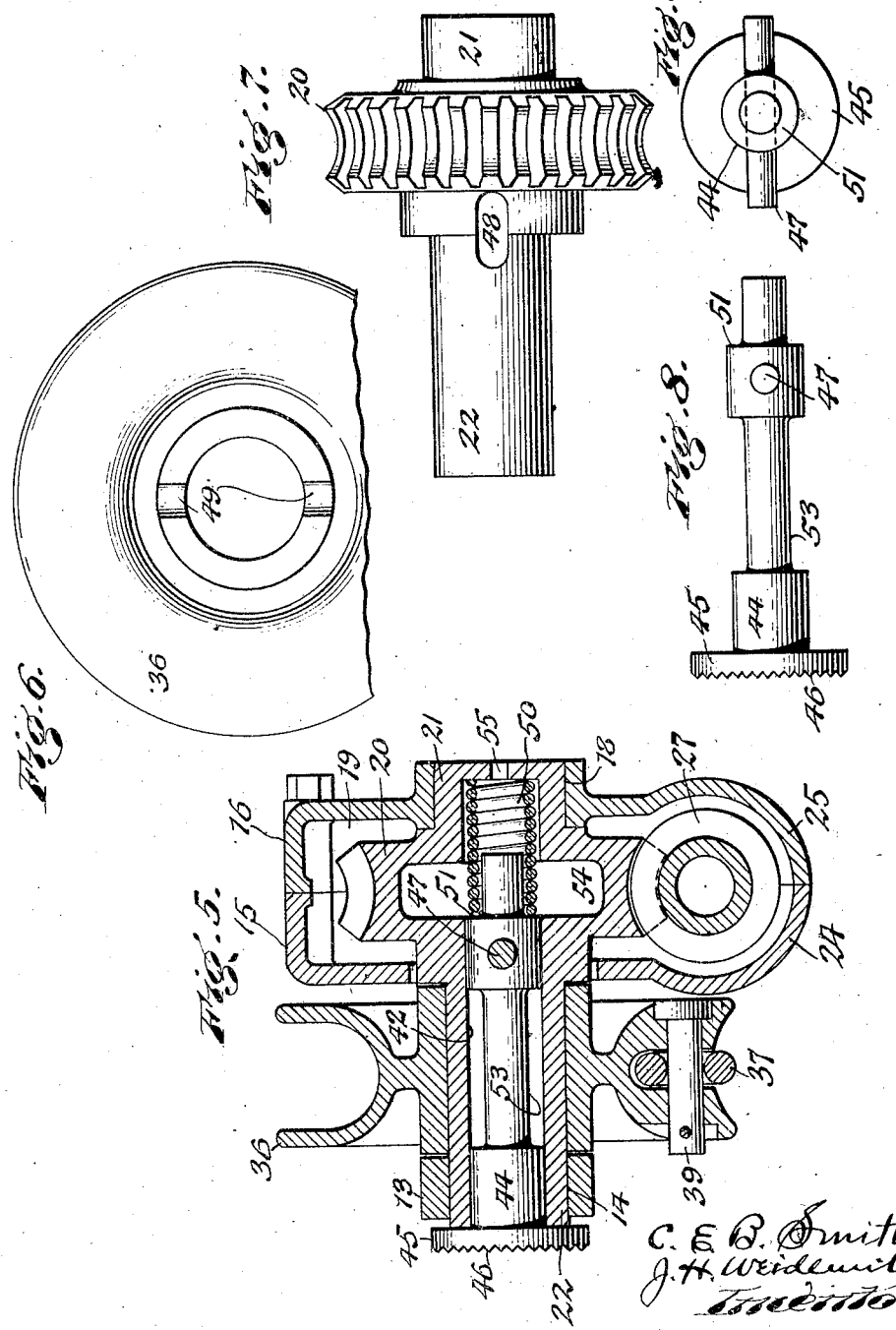

1,597,930

UNITED STATES PATENT OFFICE.

CHARLES E. B. SMITH AND JOHN H. WEIDEMILLER, OF BUFFALO, NEW YORK.

BRAKE MECHANISM.

Application filed August 10, 1925. Serial No. 49,198.

This invention relates to the hand operated brake mechanism for railway cars.

The principal object of this invention is to provide a brake mechanism which insures the maximum protection or safety for the life and limb of the trainmen as well as for the equipment and the lading which is being transported.

Another object of this invention is the provision of means whereby the brakes may be released from the ground and thereby avoid the necessity of climbing on top of the car for this purpose as has been necessary heretofore.

Another object of this invention is to so organize this brake mechanism that a very powerful application of the same may be made with ease and with gradually increasing speed and power, so as to cause the slack in the brake chain or connection to be quickly taken up and apply the greatest pressure during the last part of the brake setting operation and also permit of gradually releasing the brakes with ease.

Another object of this invention is to provide a brake mechanism which can be used with greater safety by a trainman, which contains no ratchets, pawls or other similar parts which are liable to become broken or to get out of order and render the brake mechanism inoperative.

Another object of this invention is to provide a brake mechanism in which the main working parts are completely enclosed so that the same are protected against the weather and prevented from becoming clogged by dirt, rain, snow and ice and also to enable the parts to be constantly lubricated and thus not only ensure easy working of the same but also protect the same against rust and corrosion.

Further objects of this invention are to provide a brake mechanism which is capable of use in connection with the brake mechanism now in general use thereby avoiding undue cost of installation and to improve the brake mechanism in various details of construction which will be hereinafter more fully set forth.

With these objects in view this brake mechanism consists generally in arranging a worm gearing between the usual hand operated shaft or staff and the chain which is connected with the regular brake mechanism and brake shoes, also to provide a winding member having the form of a sheave, wheel or drum having a cam or spiral peripheral surface upon which the winding end of the pull line or chain is wrapped during the operation of applying the brakes and employing a clutch between the worm gearing and the winding member which automatically couples these parts but permits of quickly uncoupling the same either by foot or hand pressure so as to permit the brakes to instantly release without affecting the position of the hand operated staff or shaft.

In the accompanying drawings:—

Figure 1 is a side elevation of the preferred embodiment of our invention applied to the under side of the car body.

Figure 2 is a front elevation of the same.

Figure 3 is a vertical transverse section taken on line 3—3, Fig. 1.

Figure 4 is a fragmentary vertical longitudinal section taken on line 4—4, Fig. 2.

Figure 5 is a horizontal section taken on line 5—5, Fig. 1.

Figure 6 is a fragmentary face view of the winding drum forming part of this brake mechanism.

Figure 7 is a side elevation of the worm wheel and its shaft which form part of the worm gearing of this brake mechanism.

Figure 8 is a side elevation of a shifting rod forming part of the clutch mechanism between the worm gearing and the winding sheave.

Figure 9 is an end elevation of the same.

The numeral 10 represents the lower part of a car body at one end thereof upon which our improved brake mechanism is adapted to be mounted, which car body may be of any suitable construction. Below the under side and adjacent to the end of the car body is arranged a bracket which forms part of our invention and which in the preferred construction shown in the drawings, comprises an upper base 11 which may be secured to the under side of the car by means of bolts 12, as shown in the drawings, or by other suitable means, and two arms or hangers depending from this base, one of these arms 13 being formed integrally with the base and provided at its lower end with a bearing 14 and the other arm being composed of an inner section 15 which is formed integrally with the base and an outer section 16 which is made of a separate piece and bolted to the inner section 15 by means of bolts 17 and provided with a bearing 18. The arm 13 and the inner section 15 of the other arm are spaced apart, and the opposing sides of the arm sections 15 and 16 are hollowed out so as to form together a gear casing 19.

Within this gear casing is arranged a worm wheel 20 which is formed integrally with a shaft, one end 21 of which is short and journaled in the bearing 18 while the other end 22 of the same is long and projects through an opening 23 in the outer side of the arm 15 and across the space between the arm section 15 and the arm 13 and is journaled at its extremity in the bearing 14, as shown in Fig. 3.

The arm sections 15 and 16 are provided with forward extensions 24, 25 which together form a forward extension 26 of the worm gear casing and in this casing extension is arranged an upright worm 27, the trunnions at the upper and lower ends of which are journaled in divided bearings 28, 29, formed equally between the parts of the arm sections 15 and 16 above the casing extension 26 and between these arm sections at the lower end of this casing extension. In order to save the upper and lower parts of the casing extension from undue wear due to the longitudinal thrust of the worm 27, thrust washers 30, 31 are employed which surround the trunnions formed by the upper and lower parts of the worm shaft and are interposed between the upper and lower ends of its thread and the inner side of the bearings 28 and 29, as best shown in Fig. 4.

This worm is operatively connected with the lower end of an upright staff or shaft 32 the upper end of which extends to the top of the car where it is provided with the usual hand wheel for turning the same manually in a well known manner. The connection between this staff and the worm, as shown in the drawings is effected by providing the lower end of the staff with a socket 33 which receives a shank 34 at the upper end of the worm shaft, this socket and shank being preferably square in horizontal section so as to compel the worm and staff to turn together but in the preferred construction an additional fastening pin 35 is employed which extends through this socket and shank, as best shown in Fig. 4.

Upon that part of the worm wheel shaft which extends across the space between the arm 13 and the arm section 15 is mounted a winding sheave or wheel 36 upon the periphery of which is adapted to be wound the free end of the line or chain 37 or other flexible motion transmitting member which is connected with those parts which move the brake shoes toward the periphery of the car wheels for the purpose of producing a braking effect. This winding sheave is provided at its periphery with an annular groove 38 which receives the free end of the brake chain or member 37 and which is provided with a coupling pin 39 extending across one part of the groove 38 and receiving the end link of the brake chain. The bottom or peripheral surface of the groove 38 is preferably made in the form of a cam, snail or spiral, the highest part 40 of which is arranged adjacent to the front side of the coupling pin 39 while the lowest part 41 thereof is adjacent to the opposite or rear side of this coupling pin, as shown by dotted lines in Fig. 1. The effect of this cam bottom or peripheral surface on the winding sheave is to cause a comparatively rapid take-up action of the chain on the sheave during the initial portion of the brake applying operation and a gradually decreasing speed in this chain winding operation as the brake shoes move toward the wheel of the car, thereby exerting a pressure of gradually increasing power or leverage upon the brake shoes, as the winding operation progresses so that the greatest leverage or drawing effect is exerted upon the brake shoes when the brake shoes are in engagement with the car wheels.

By this means the slack in the brake chain or rigging can be quickly taken up so as to ensure a quicker application of the brakes and after this slack is taken up the maximum pressure is applied to the brake shoes for effectively resisting the rotation of the car wheels and gradually bringing the car to a stand still.

A clutch mechanism is provided which permits of coupling the worm gearing and the winding sheave so that motion is transmitted from the manually operated staff 32 to the brake chain 37 for applying the brakes, but which will permit of instantly disconnecting the winding sheave from the worm gearing and thus permit of a quick release of the brakes. This clutch mechanism is preferably arranged close to the ground so that the same can be uncoupled by the pressure of the foot or hand of the trainman while he is on the ground and thereby avoid the necessity of climbing on top of the car body for this purpose whereby the safety of the trainman is insured and considerable time is saved in the brake releasing operation.

Although this clutch or coupling may be variously constructed that shown in the drawings is preferred and constructed as follows.

The numeral 42 represents a cylindrical guideway formed lengthwise in the long section 22 of the worm wheel shaft and 43 is a pocket formed in the short section 21 of this shaft. Slidable lengthwise within the guide way 42 is a shifting rod 44 which is provided at its outer end with a presser head 45 which preferably has its outer face knurled, scored or serrated, as shown at 46. Near its inner end this shifting rod 44 is provided with a transverse pin 47, the opposite ends of which project through longitudinal slots 48 in the adjacent parts on the shaft section 22 and also adapted to move into and out of engagement with notches 49 formed on diametrically opposite sides of the adjacent part of the hub of the cam sheave 38, as shown in Figs. 3, 5 and 6. The shifting rod 44 is moved outwardly and yieldingly held in this position for engaging the ends of its pin 47 with the notches 49 of the cam sheave by means of a spring 50 which is arranged axially within the worm wheel and bears at one end against the bottom of the pocket 43 while its other end bears against a shoulder 51 formed on the reduced inner end of the shifting rod 44, as shown in Figs. 3 and 5.

Normally the pin 47 is in engagement with the notches 49 so that a forward rotary motion applied to the staff 32 will cause the worm and worm wheel to turn forwardly and the cam sheave to be also turned forwardly with the worm wheel for the purpose of causing the brake chain 37 to be wound on the periphery of the cam sheave and the brake shoes to be thereby moved toward the car wheels for applying the brakes. Owing to the employment of a worm and worm wheel between the brake staff 32 and the cam sheave no ratchet mechanism or detent pawl is necessary to prevent retrograde or unwinding movement of the sheave and staff inasmuch as this function in the present case is performed by engagement of the worm on the staff with the worm wheel which is connected with the sheave, thereby avoiding the use of any delicate parts which are liable to get out of order and impair the safety of the brake mechanism. If a gradual or slight release of the brakes is desired this can be accomplished by turning the brake staff backwardly as much as desired which can be done easily and without releasing the brakes altogether and still causing the brakes to be held in the position desired due to the worm gearing. When it is desired to release the brakes quickly after an application of the same has been made it is only necessary to push in the shifting rod 44 either by foot pressure, hand pressure or other convenient way, whereby the coupling pin 47 will be disengaged from the notches 49 of the cam sheave and thereby permit the latter to turn backwardly or in the direction in which the brake chain unwinds therefrom and releases the pull upon the brake shoes so that the latter are free to be disengaged from the car wheels. This release of the cam sheave can be effected while the trainman is standing on the ground, thereby not only saving time inasmuch as it avoids the necessity of climbing on top of the car for this purpose but it also increases the safety in the operation of the brake mechanism.

For the purpose of lubricating the bearings of this brake mechanism grease or other suitable lubricant is introduced into the hollow worm wheel shaft through an opening 55 in the end of its short section 21. From the interior of this shaft the grease is conducted through ducts 52, 56 and 57 to the bearing surfaces between the worm wheel shaft and the cam sheave and the arm 13 and arm section 16, respectively. In order to provide a reservoir for holding a larger quantity of grease the worm wheel is made hollow to form a storage chamber or reservoir 54 for lubricant and thus necessitates less frequent refilling. Some of the grease flows from the hollow worm wheel shaft through the slots 48 into the casing 19 and its extension 26 formed between the arm sections 15, 16, from which it is picked up by the moving worm gearing therein and delivered to the lower and upper bearings 29, 28 of the worm.

For the purpose of facilitating the passage of grease to the ports 52 and 57 the central part of the shifting rod 44 is reduced, as shown at 53, thereby providing a passage way for the lubricant. The inner part of the shifting rod 44 which is traversed by the coupling pin 47 is fitted sufficiently loose in the adjacent part of the guide way 42 to permit the passage of grease slowly therebetween from the chambered portion of the worm wheel shaft to the delivery ducts 52 and 57.

It will be apparent from the foregoing that by this means all of the bearing surfaces of this mechanism will be thoroughly lubricated thereby reducing the wear on the same to a minimum and maintaining the apparatus in the highest state of efficiency, for a considerable time.

In operating this brake mechanism it is possible to apply the same easily and gradually with a powerful pressure and to hold the same at any point without the use of ratchet wheels or pawls, and it is also possible to ease off the brakes easily and gradually as much as necessary without losing control of the same, this being due to the use of the worm gearing which forms a positive lock for the brake mechanism in all positions of the same. A much more powerful application of the brakes is therefore possible than is possible by the use of a club or bar commonly employed heretofore by trainmen for obtaining a greater leverage on the hand wheel, nor is it possible for the trainman to lose control of the brakes when applying or releasing the same as often happens when using a club in the manner described and a ratchet mechanism which when released permits the hand wheel to fly back without restraint and release the brakes all at once, at which time the trainman is liable to be hit by the flying club and thrown from the car.

As a whole this brake mechanism is very simple, durable and compact in construction, it can be produced at a comparatively low cost, it can be readily installed on cars already equipped with a hand brake mechanism of the character heretofore in common use, and it not only renders the operation of the brake mechanism safer and more rapid, but it also permits of a much more powerful application of the brakes than has been possible heretofore and thus enables a car to be brought more promptly to a stand still or under reduced speed when this is necessary in order to avoid danger or injury.

We claim as our invention:—

1. A brake mechanism for railway cars comprising a worm wheel having a hollow shaft and a longitudinal slot extending from the inner to the outer side of said shaft, a worm meshing with said worm wheel, a sheave journaled on said shaft and provided with a notch in its hub, a shifting rod slidable lengthwise in said shaft, and a coupling pin projecting laterally from said rod through said longitudinal slot and movable into and out of engagement with said notch.

2. A brake mechanism for railway cars comprising a worm wheel having a hollow shaft and a longitudinal slot extending from the inner to the outer side of said shaft, a worm meshing with said worm wheel, a sheave journaled on said shaft and provided with a notch in its hub, a shifting rod slidable lengthwise in said shaft, a coupling pin projecting laterally from said rod through said longitudinal slot and movable into and out of engagement with said notch, and a spring acting on said rod and holding said pin yieldingly in engagement with said notch.

3. A brake mechanism for railway cars comprising a bracket provided with depending arms having bearings, a hollow shaft journaled in said bearings and having a filling opening for introducing a lubricant into the shaft and also having discharge ducts leading to said bearings, a worm wheel arranged on said shaft, a worm meshing with said worm wheel and rotatably mounted on one of said arms, a winding sheave rotatable about said shaft, the latter being provided with a lubricant delivery duct leading to the bore of said sheave, and a pull line adapted to be wound on said sheave and to be connected with shoes of said brake mechanism, said worm wheel being hollow and serving as a lubricant reservoir.

4. A brake mechanism for railway cars comprising a bracket provided with depending arms having bearings, a hollow shaft journaled in said bearings and having a filling opening for introducing a lubricant into the shaft and also having discharge ducts leading to said bearings, a worm wheel arranged on said shaft, a worm meshing with said worm wheel and rotatably mounted on one of said arms, a sheave rotatable about said shaft, the latter being provided with a lubricant delivery duct leading to the bore of said sheave, and a pull line adapted to be wound on said sheave and to be connected with brake shoes forming part of the brake mechanism, one of said arms being divided into sections which are hollow and form between them a casing which encloses said worm and worm wheel.

CHARLES E. B. SMITH.
JOHN H. WEIDEMILLER.